United States Patent
Shaw

(10) Patent No.: US 6,285,934 B1
(45) Date of Patent: Sep. 4, 2001

(54) APPARATUS AND METHOD FOR MONITORING MOTOR VEHICLE FUEL TANK CAP

(76) Inventor: Richard J. Shaw, W. 289 N. 7882 Park Dr., Hartland, WI (US) 53029

( * ) Notice: Subject to any disclaimer, the term of this patent is extended or adjusted under 35 U.S.C. 154(b) by 0 days.

(21) Appl. No.: 09/450,281

(22) Filed: Nov. 26, 1999

Related U.S. Application Data

(63) Continuation-in-part of application No. 08/958,522, filed on Oct. 27, 1997, now abandoned.

(51) Int. Cl.[7] ................................................ G06F 7/00
(52) U.S. Cl. ................ 701/36; 701/29; 220/203.24; 220/203.26; 220/303; 81/3.4; 81/121.1
(58) Field of Search ................ 701/36, 29; 73/149, 73/290 R, 309, 25.01, 31.05, 304 C, 301; 220/288, 203, 303, 304, 203.05, 203.06, 295, 210, DIG. 3; 81/3.4, 121.1

(56) References Cited

U.S. PATENT DOCUMENTS

| | | | |
|---|---|---|---|
| 4,280,346 | 7/1981 | Evans | 70/165 |
| 4,373,388 * | 2/1983 | Kitamura et al. | 73/301 |
| 4,436,219 | 3/1984 | Reutter | 220/295 |
| 4,765,505 | 8/1988 | Harris | 220/288 |
| 4,779,755 * | 10/1988 | Harris | 220/203 |
| 4,795,054 * | 1/1989 | Brown | 220/254 |
| 5,108,001 | 4/1992 | Harris | 220/203 |
| 5,441,168 * | 8/1995 | Carlini | 220/378 |
| 5,449,086 | 9/1995 | Harris | 220/288 |
| 5,638,975 | 6/1997 | Harris | 220/288 |
| 5,794,806 * | 8/1998 | Harris et al. | 220/203.26 |
| 5,896,785 * | 4/1999 | Shaw et al. | 81/3.4 |

* cited by examiner

Primary Examiner—Jacques H. Louis-Jacques
(74) Attorney, Agent, or Firm—Robert T. Johnson

(57) ABSTRACT

Proper mounting of a motor vehicle fuel tank cap on a vehicle fill pipe is of major importance to reduce the vapors which on escaping from the fuel tank contributes to environmental pollution, to insure proper mounting of the gas cap there is provided in this invention apparatus and method for monitoring proper mounting of the motor vehicle fuel tank cap, on the fill pipe of the vehicle and the apparatus includes strain gauges, connected to a monitor computer and an alarm activated by the monitor computer to indicate proper or improper mounting of the fuel tank cap on the fill pipe of the vehicle fuel tank.

4 Claims, 14 Drawing Sheets

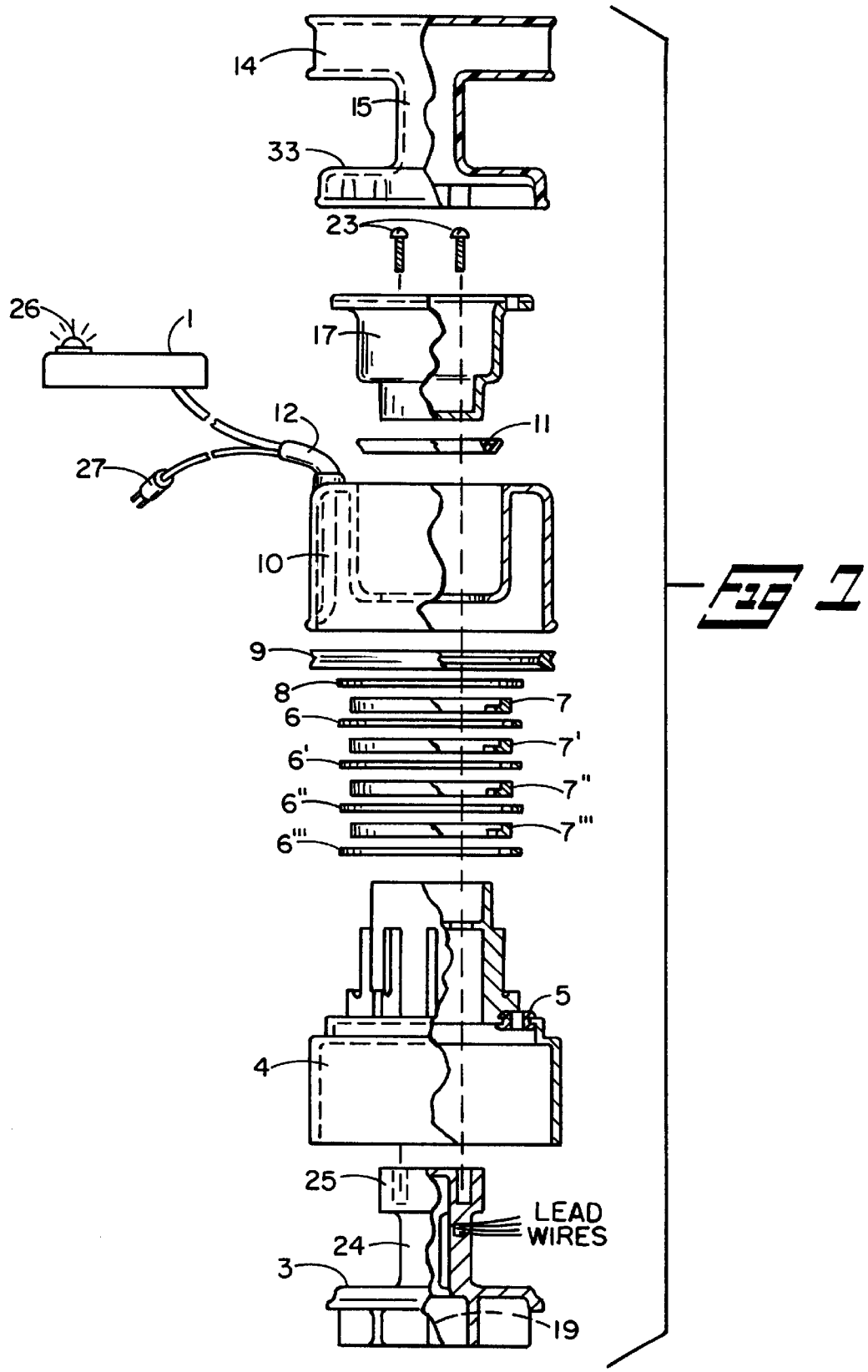

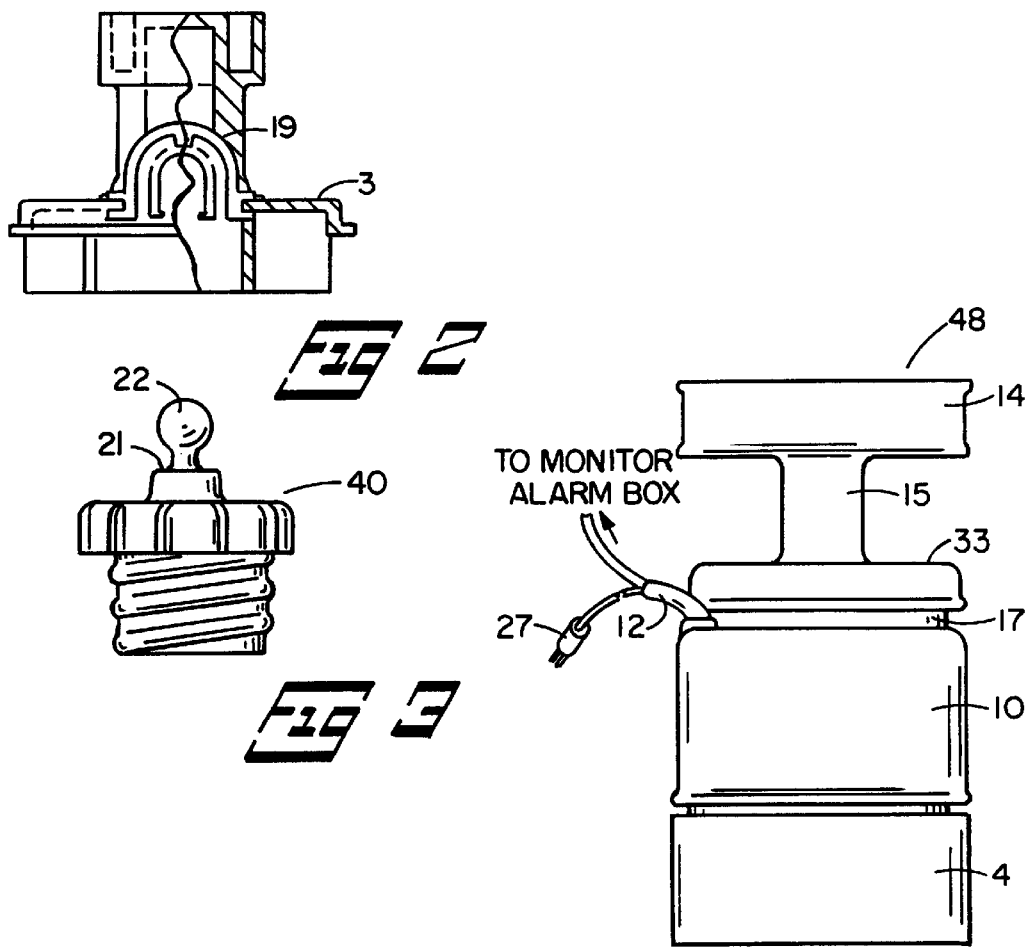
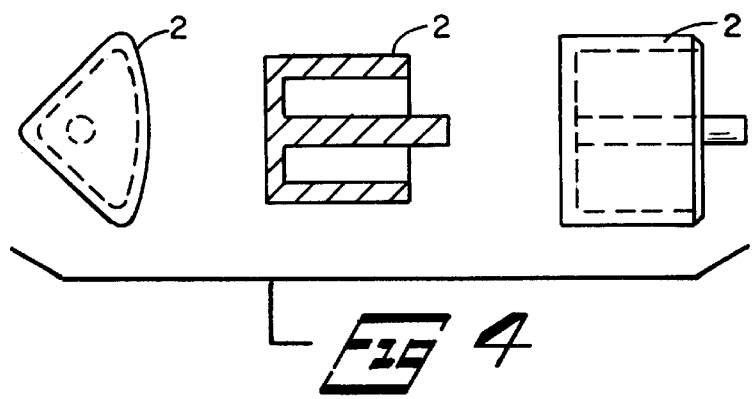

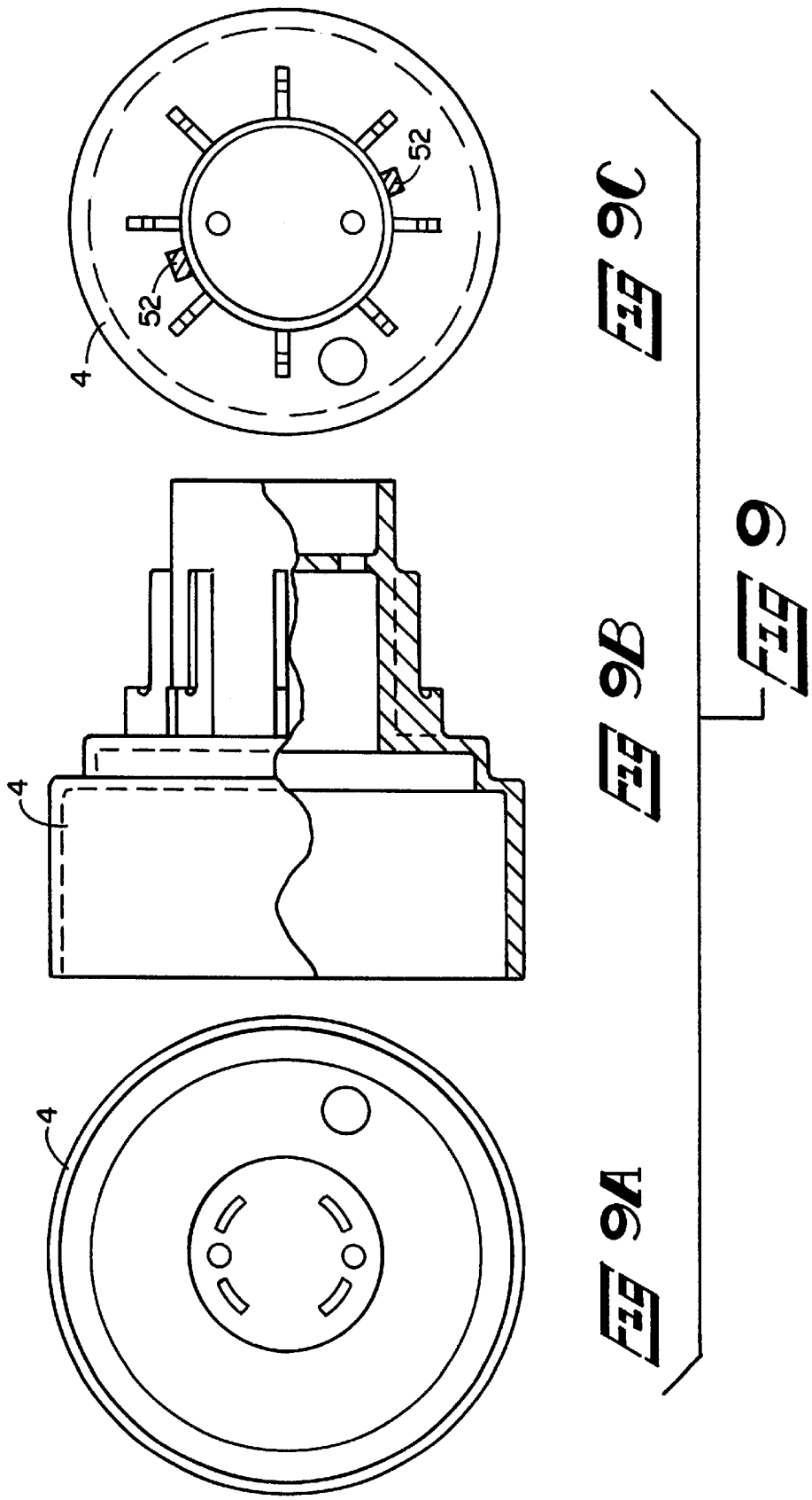

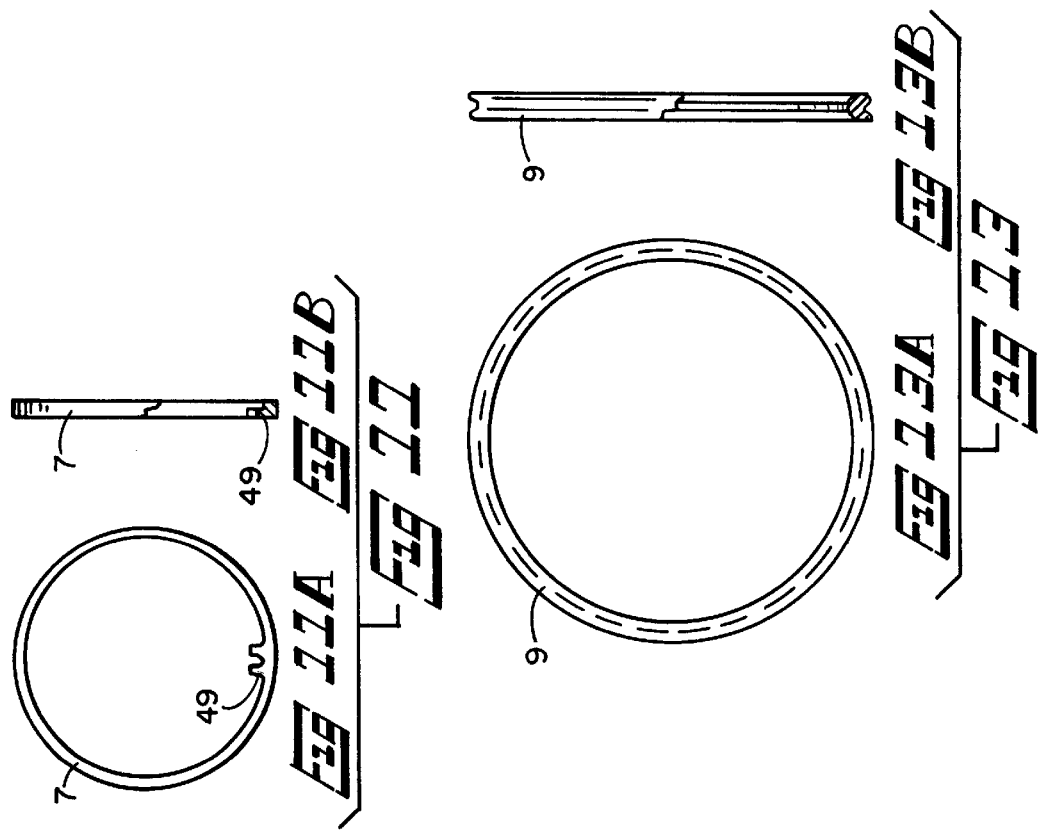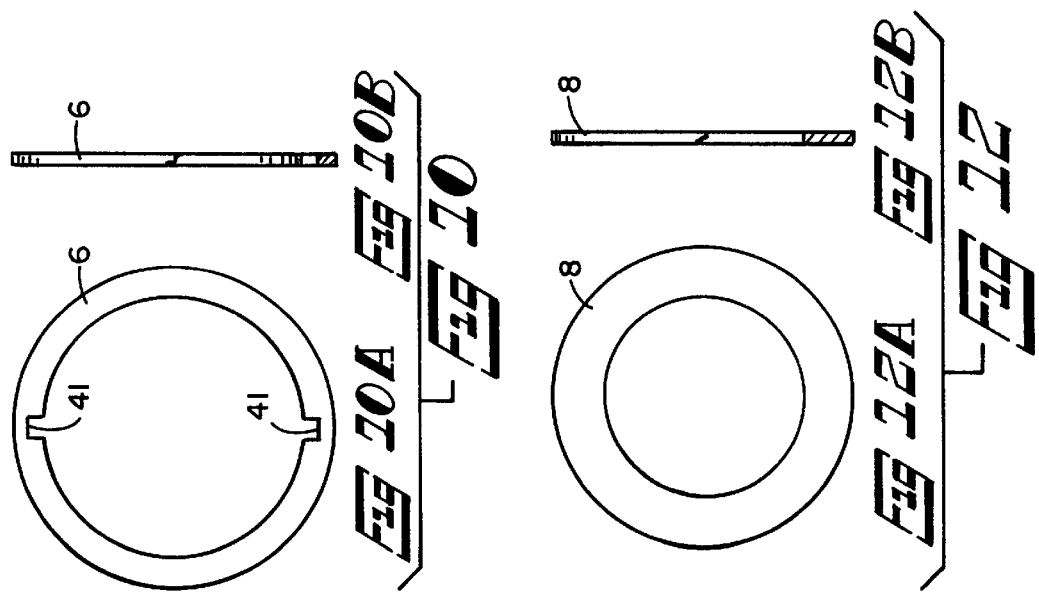

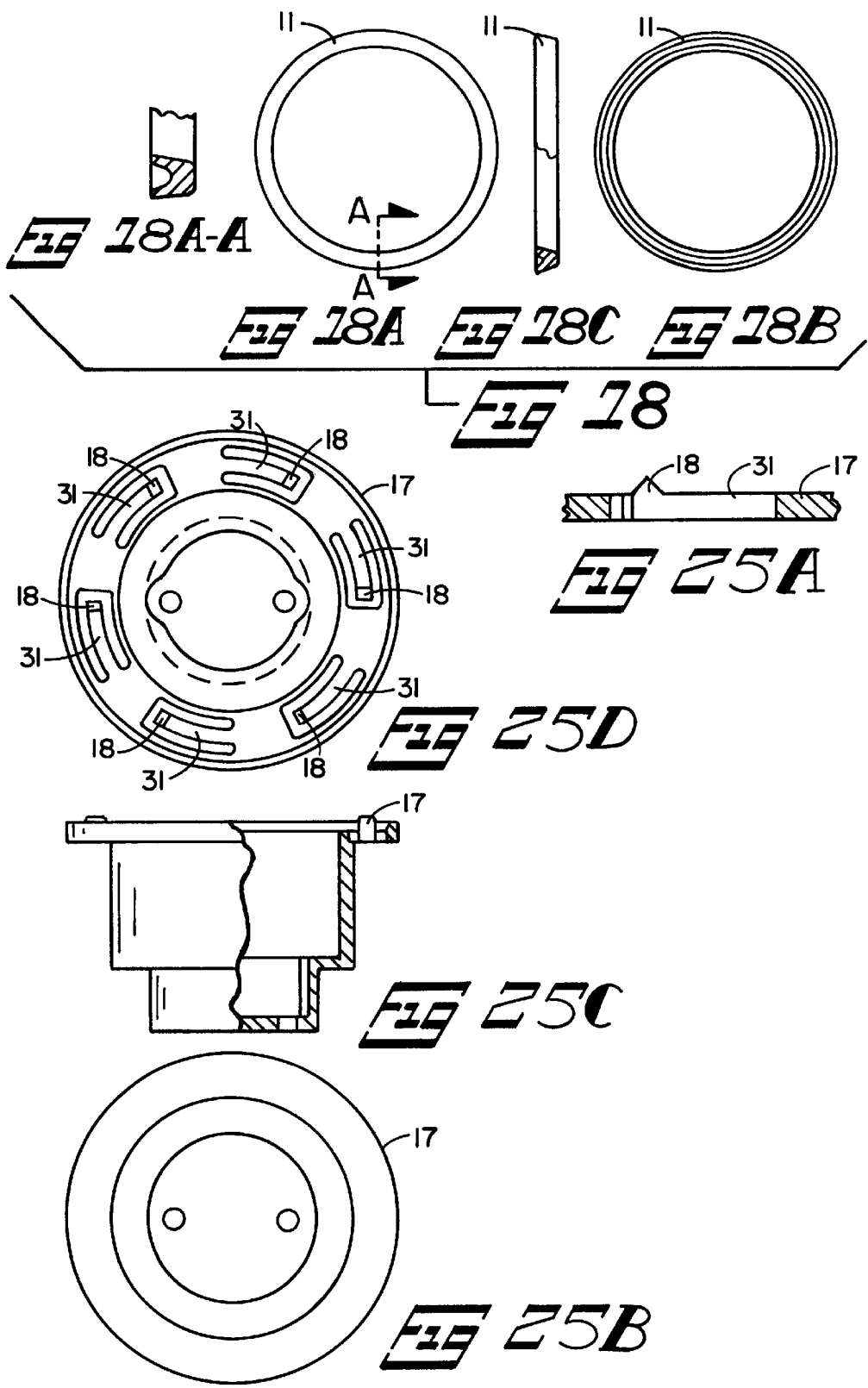

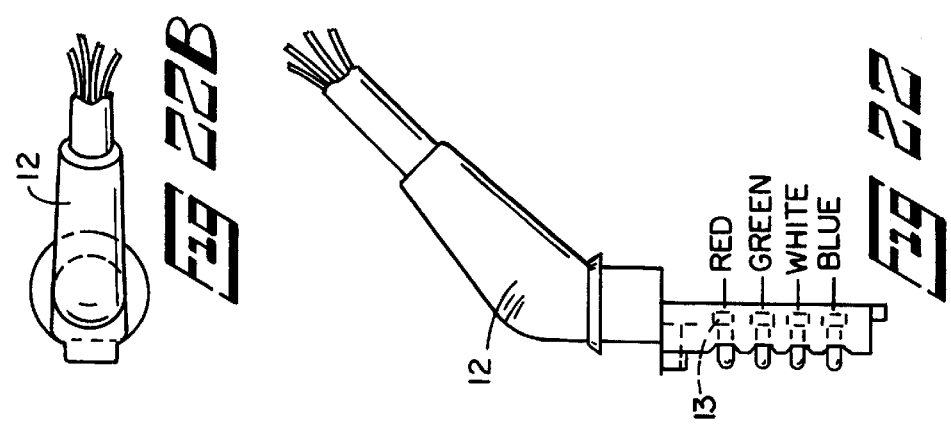
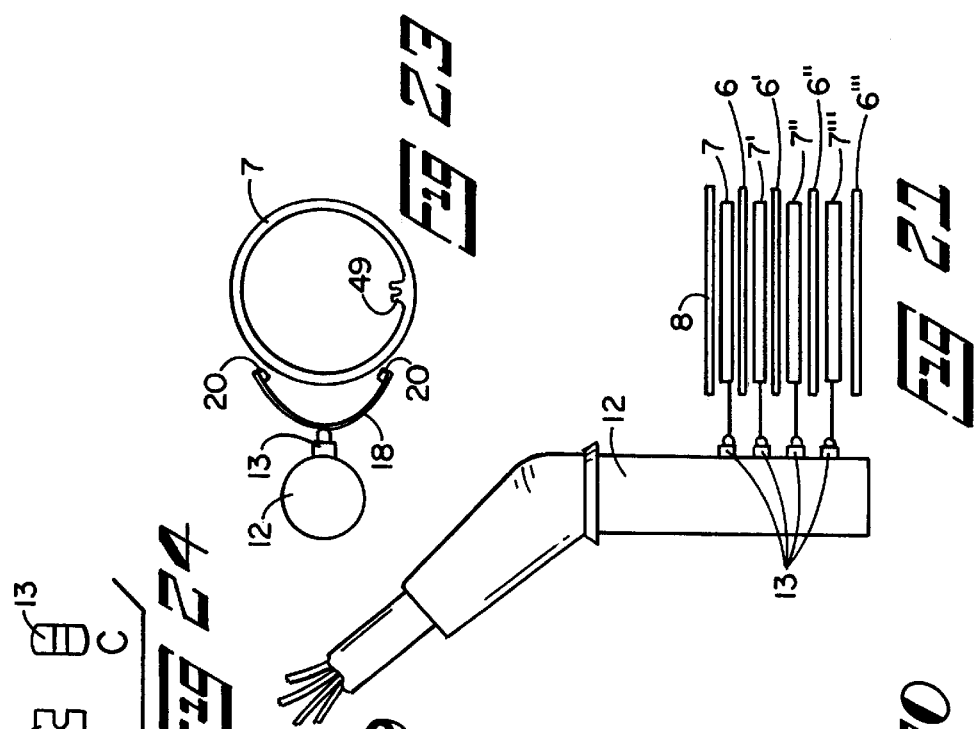
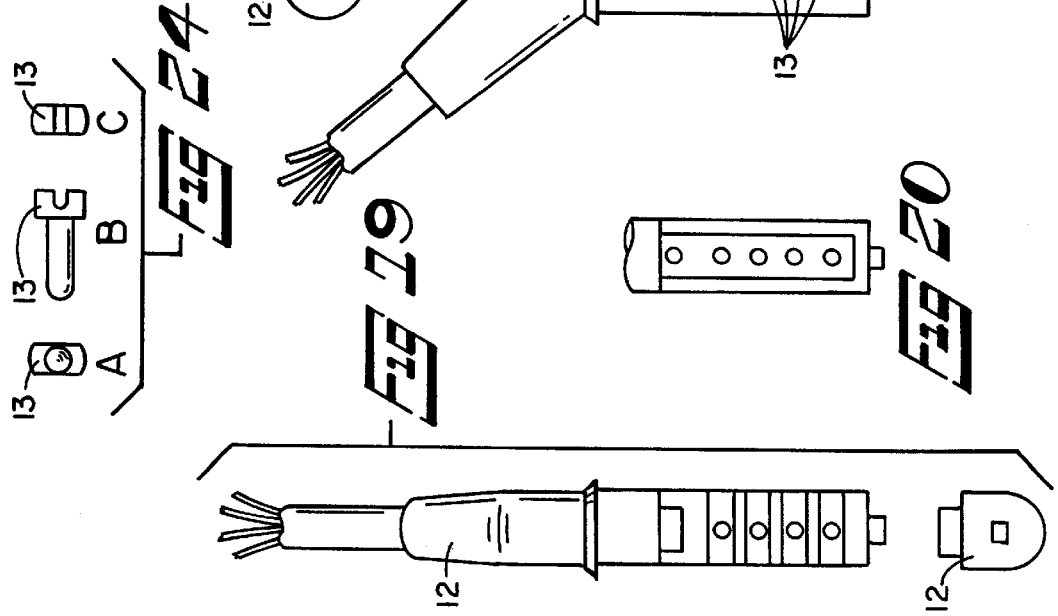

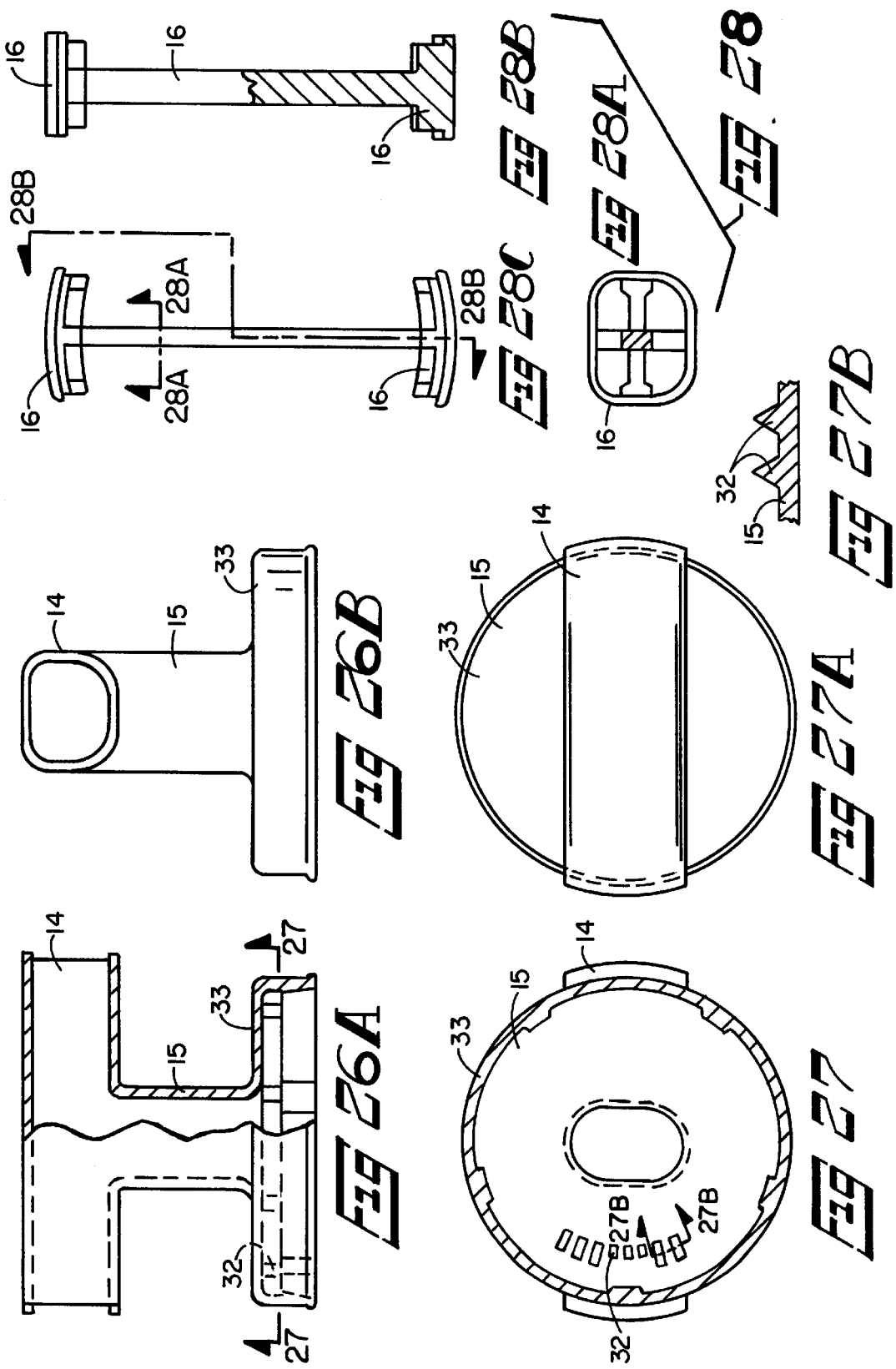

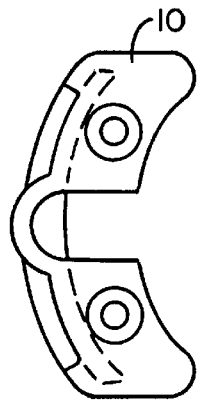
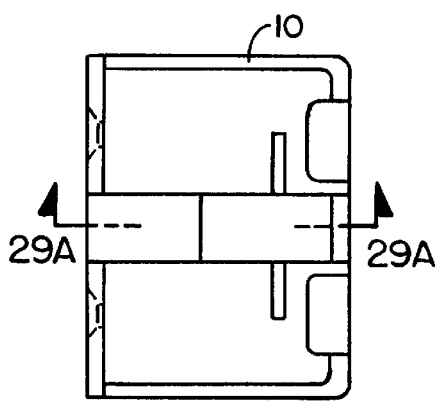
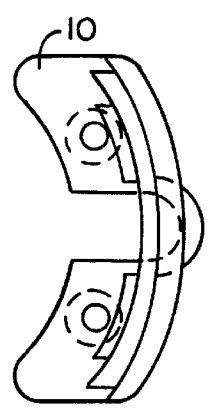
FIG 29B          FIG 29          FIG 29C
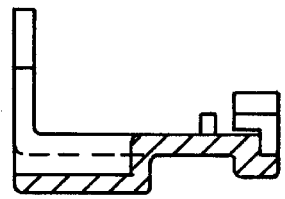
FIG 29A
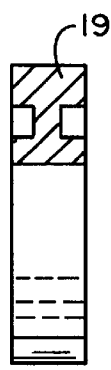
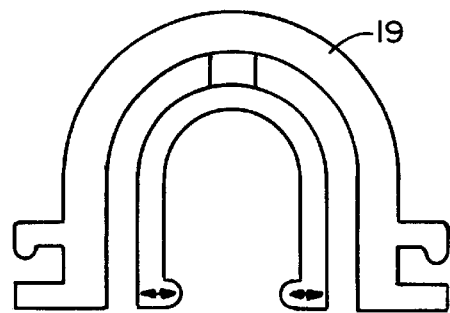
FIG 30B          FIG 30A

WIRE COLORS
R - RED
B - BLUE
G - GREEN
W- WHITE

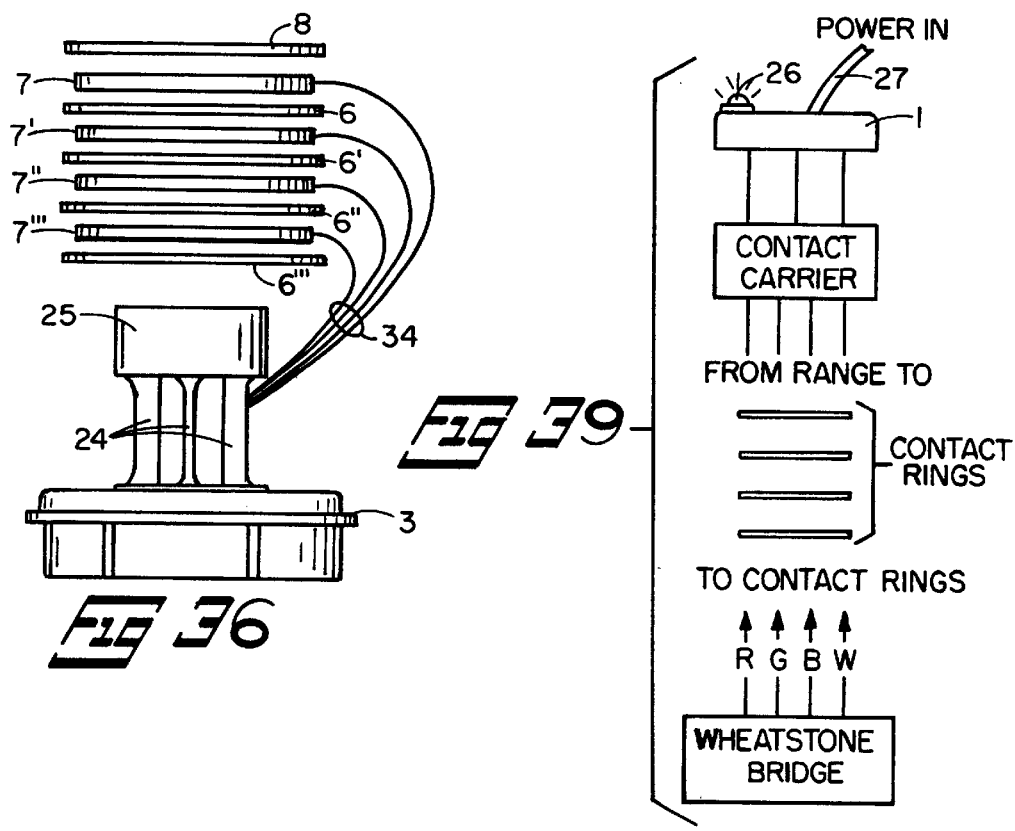
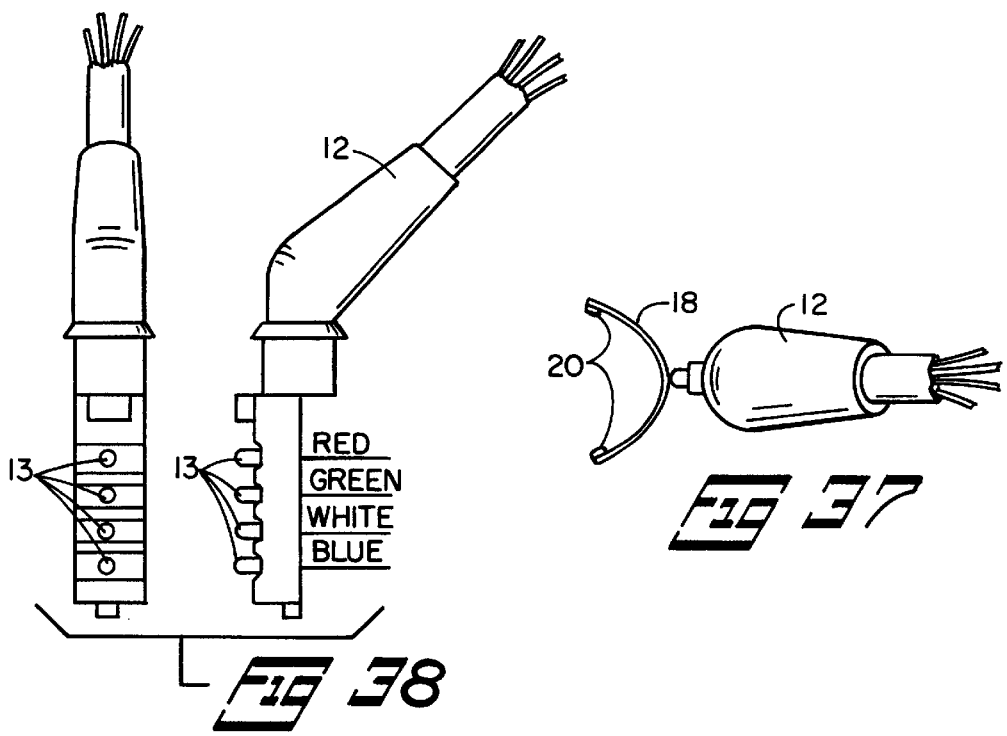

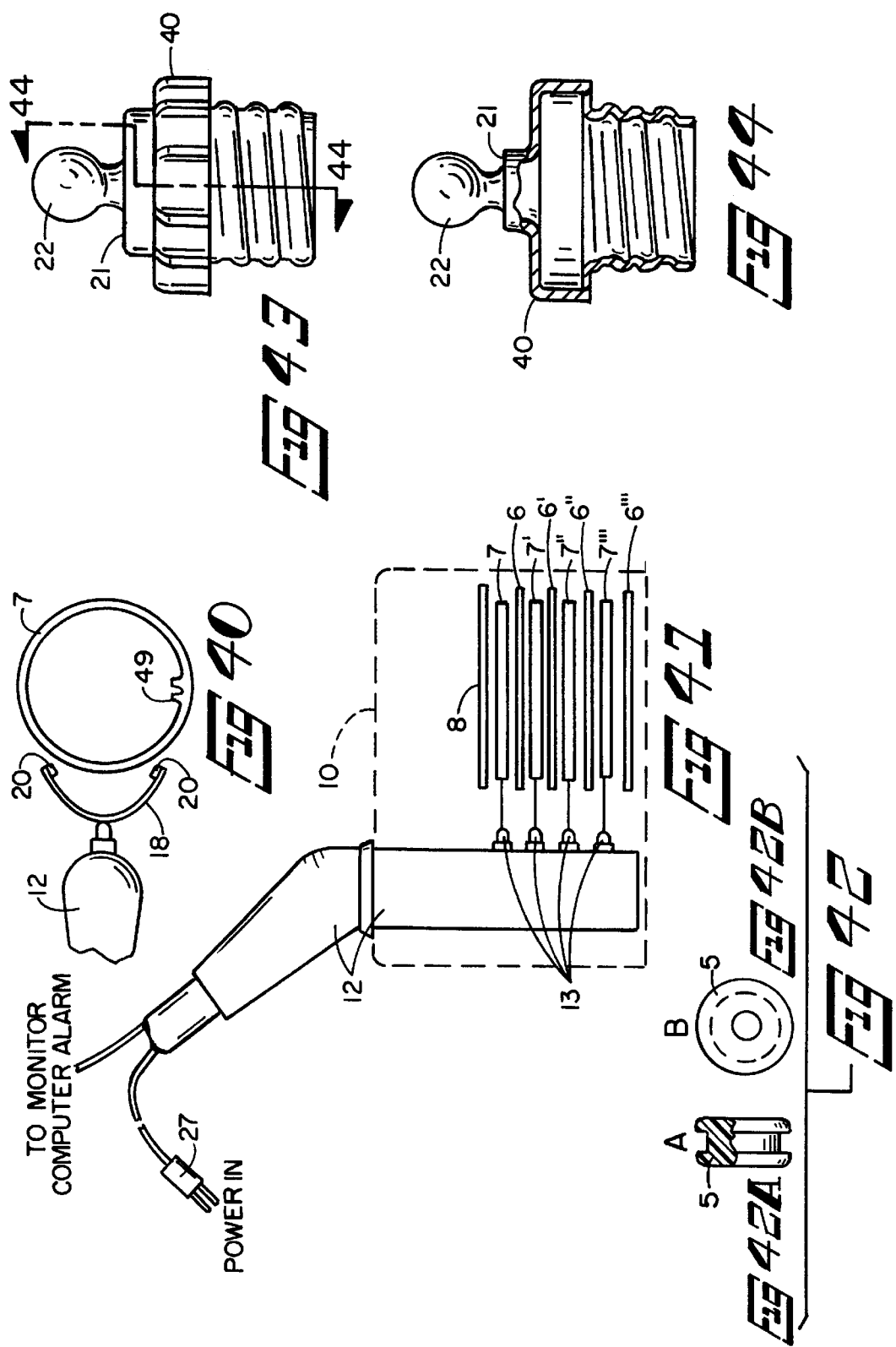

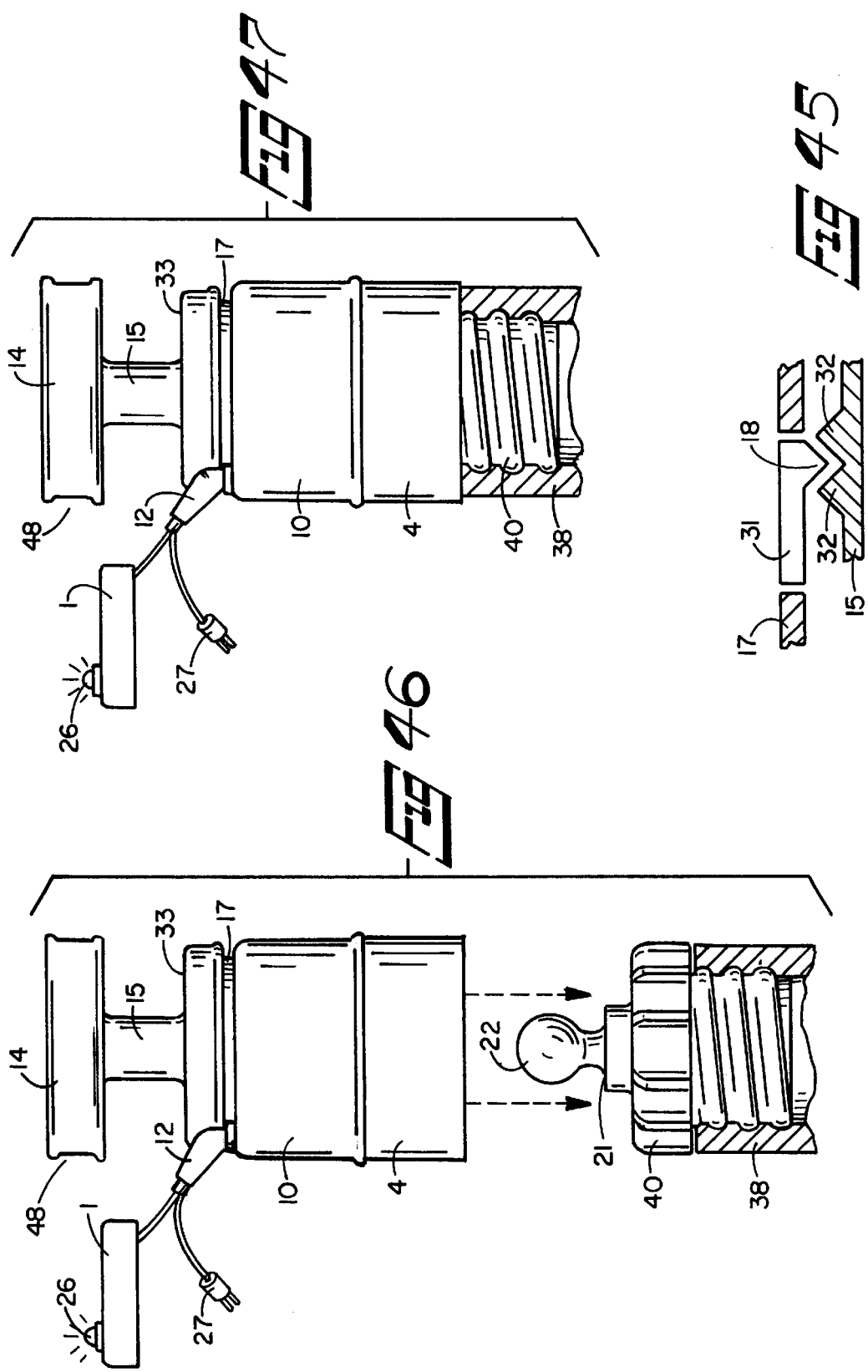

APPARATUS AND METHOD FOR MONITORING MOTOR VEHICLE FUEL TANK CAP

BACKGROUND OF THE INVENTION

This application filed per 37 CFR 1.53b(2)is a continuation-in-part of previous application Ser. No. 08/958, 522 filed Oct. 27, 1997, now abandoned, having the same title and inventor, and is filed under 37 CFR 1.53b(2).

This invention is to disclose apparatus and method for monitoring motor vehicle fuel tank caps to insure adequate tightening of fuel/gas caps of motor vehicles, such as cars, trucks motorcycles etc. At the present time, particularly with self service gas stations, there is a problem of adequately tightening the fuel/gas cap after filling the fuel or gas tank.

When a fuel/gas cap is not adequately tightened, volatile components from the fuel or gasoline are vented out of the as tank past the cap and thus pollutes the atmosphere.

The gas cap monitor apparatus and method of this invention insures adequate tightening of the fuel/gas cap, after refueling,to prevent venting of vapors out of the gas tank, via the filler tube. By having adequate tightening of the vehicle fuel tank cap by the apparatus of this invention, as indicated by the monitor computer alarm of this apparatus, the atmosphere is protected from added pollution.

PRIOR ART IN THIS FIELD OF INVENTION

Prior art patents pertaining to this invention are;

U.S. Pat. No. 5,638,975 for LOST MOTION FUEL CAP WITH CLOSURE INDICATOR. A fuel cap including a closure mechanism and an indicator for providing indication of sealed closure of the cap on the filler tube.

U.S. Pat. No. 5,449,086 for DELAYED ACTUATION FUEL CAP. This patent discloses a fuel cap with a delayed actuation mechanism for providing a lost-motion driving connection between the handle of the cap and the housing.

U.S. Pat. No. 5,108,001 for PRESSURE RELEASE VENT CAP. This patent discloses a pressure relief and venting closure and includes provision of a torque over-ride for the closure to limit its rotary movement.

U.S. Pat. No. 4,765,505 for DELAYED ACTUATION FUEL CAP. Disclosure is made of a predetermined lost motion angle through which the handle and drive lug are permitted to rotate, relative to the driven lugs coupled to the closure.

U.S. Pat. No. 4,436,219 for SEALING CAP FOR A GASOLINE TANK. Disclosure is made of a gas cap and including an indicator window so one can read off the fully closed position of the sealing cap with certainty.

U.S. Pat. No. 4,280,346 for TORQUE OVERRIDE THREADED LOCKING CAP. Disclosure is made of a key locking cap for a threaded filler neck and provides for free ratcheting of the cap when locked.

U.S. Pat. No. 3,642,036 for AUTOMATIC FUELING FOR AUTOMOBILES Disclosure is made of a system for fueling a car by programmable means.

U.S. Pat. No. 5,671,786 for APPARATUS FOR AUTOMATIC REFUELING OF VEHICLES. Disclosure is made of apparatus for opening the fuel tank pipe of the vehicle and includes a robot head and a transceiver unit carried by the robot head.

SUMMARY OF THE INVENTION

This invention is to disclose apparatus and method for monitoring a motor vehicle fuel tank cap,to insure adequate tightening of the gas cap. A tight gas cap is to insure protection of the environment by preventing release of hydrocarbon fuel vapors from a refueled automobile filler pipe and past the gas cap.

The apparatus of this invention has a handle connected to a torsion plate cover which in turn fits over a bell shaped torsion plate and the torsion plate having side walls on the interior of the bell shaped torsion plate, and the side walls on the interior of the torsion plate forming channels across the inside diameter of the bell shape torsion plate and these channels to straddle the ridge of the gas cap to remove the gas cap on turning in a counter clockwise direction and further there is a gas cap ball head extending upward from the center of the fuel/gas cap ridge so that the gas cap is removed on unscrewing and the fuel/gas cap is held in the torsion plate by means of a gas cap clip extending over the gas cap ball head.

The torque indicating device mounted on torsion plate shaft pillars is in essence a wheatstone bridge with wires leading from strain gauge indicating device to contact rings then to the contact carrier and to a monitor computer alarm set to respond to a preset strain gauges "torque" measurement level to indicate suitable tightening of the gas cap after refueling.

Electric power is supplied to the monitor apparatus, which in turn supplies the power to the monitor computer alarm from the strain gauges indicating suitable fuel cap tightening on rotating the monitoring apparatus and fuel cap attached thereto on the fuel tank fill pipe.

The monitor computer alarm is set to respond audibly or visually at certain torque level, as indicated by the strain gauges, to indicate adequate closing of the vehicle fuel tank cap, or warning of failure to use,to adequately tighten the fuel tank cap onto the vehicle fill pipe.

OBJECTS OF THIS INVENTION

The monitor computer alarm is set to respond audibly or visually at a certain torque level to indicate placement and adequate closing of the fuel/gas cap, or warning of failure to adequately tighten the fuel/gas cap of the refueled automobile, or other vehicle.

An object of this invention of apparatus and method for monitoring motor vehicle fuel tank caps is to disclose apparatus, usable by hand, and comprising a torsion plate and channel walls in the torsion plate, and the channel walls providing channels in the torsion plate, and a torsion plate cover extending over the torsion plate, and the shaft of the torsion plate comprising torsion plate shaft pillars, and these pillars connected to the torsion plate shaft crown, and a strain gage mounted on each of the torsion plate shaft pillars, and the strain gages comprising a wheatstone bridge circuit, with wires extending from the strain gages to contact rings mounted inside of the torsion plate cover, and a wire from each strain gage connected to a separate one of the four contact rings, and the contact rings are insulated each from the other by means of insulating ring spacers. The electric wires from the strain gages are attached to the contact rings and for each contact ring there are contactor brushes making contact with its respective contact ring and the contactor brushes are mounted on contactor arms, and each contact ring has its own set of a pair of contact brushes mounted on its own set of contact arms, and a separate wire connected to each connector arm pair and the wire from each connector arm pair extends to a monitor computer alarm box wherein response is made as pre-set to respond to a limit of electrical response as relayed by the strain gages to torque developed on rotating clockwise by hand the handle of this fuel cap torque monitoring apparatus on tightening the vehicle fuel gas cap on the filler pipe of the fuel tank.

A further object of this invention is to disclose apparatus to limit the amount of torque applied on tightening the fuel cap on the filler pipe of the vehicle fuel tank, and the apparatus comprises a ratcheting or slipclutch arrangement for torque over ride protection between the base of the handle and the torsion plate to allow only a preset maximum torque to be attained for tightening the fuel gas cap and the slipclutch over-ride protects the strain gauge assembly from over-torque.

In this disclosure the strain gauges indicate the "torque" on rotating the vehicle fuel cap into the fuel pipe, and the monitor computer alarm is pre set to a predetermined value, from the strain gauges for suitable mounting of the fuel cap on the fill pipe of the fuel tank for a good seal of the cap on the fill pipe.

A further object of this invention is to disclose apparatus to limit the amount of torque applied on rotating the fuel gas cap on the filler pipe of the fuel tank, by means of a ratcheting arrangement between the base of the handle and the torsion plate to allow only a preset maximum torque to be attained on tightening the vehicle fuel tank cap onto the filler pipe of the fuel tank.

BRIEF DESCRIPTION OF DRAWINGS

FIG. 1 Expanded view of assembly components of motor vehicle fuel tank cap monitor apparatus.

FIG. 2 Torsion plate.

FIG. 3 Automobile gas cap and ball top.

FIG. 4 Filler block.

FIG. 8 Elevation view of assembled gas cap monitor.

FIG. 9 comprising of FIGS. 9A, 9B, and 9C, is a view of the torsion plate cover.

FIG. 9A Plan view of bottom of torsion plate cover.

FIG. 9B Side view of torsion plate cover.

FIG. 9C Top plan view of torsion plate cover.

FIG. 10 comprising of FIGS. 10A and 10B, is a view of the lower contact ring spacer.

FIG. 10A Plan view of the lower contact ring spacer.

FIG. 10B Edge view of the lower contact ring spacer.

FIG. 11 comprising of FIGS. 11A and 11B, is a view of the contact ring.

FIG. 11A Plan view of the contact ring.

FIG. 11B Edge view of the contact ring.

FIG. 12 comprising, of FIGS. 12A and 12B, is a view of the contact ring spacer.

FIG. 12A Plan view of the contact ring spacer.

FIG. 12B Edge view of the contact ring spacer.

FIG. 13 comprising of FIGS. 13A and 3B, is a view of the lower seal.

FIG. 13A Plan view of the lower seal.

FIG. 13B Edge view of the lower seal.

FIG. 18 comprising of FIGS. 18A, 18B, and 18C, is a view of the upper seal ring.

FIG. 18A Upper seal ring top plan view.

FIG. 18B Upper seal ring bottom plan view.

FIG. 18C Edge view of upper seal ring.

FIG. 18A-A Enlarged view of upper seal ring.

FIG. 19 Elevational view of contact carrier wire harness.

FIG. 20 Isolated view of section of contact carrier.

FIG. 21 Isolated elevational view of contact carrier, contacts and contact rings.

FIG. 22 Isolated elevational view of section of contact carrier connections of wires to monitor.

FIG. 22B Plan view of contact carrier.

FIG. 23 Plan view of contact brushes, contact carrier and contact ring.

FIG. 24 Contact terminal end and side views.

FIG. 25A Enlarged section of the flex tongue of the slip ring cover housing.

FIG. 25B Top plan view of the slip ring cover housing.

FIG. 25C Elevation view of the slip ring cover housing.

FIG. 25D Bottom plan view of the slip ring cover housing.

FIG. 26A Front elevation view of the handle.

FIG. 26B Cross section view of the handle.

FIG. 27 Bottom plan view of handle.

FIG. 27A Top plan view of handle.

FIG. 27B Enlarged cross section of handle bottom drive ridges.

FIG. 28 Comprising of FIGS. 28A, 28B, and 28C, is a view of the handle end cap.

FIG. 28A Top view of the handle end cap.

FIG. 28B Side view of(the handle end cap.

FIG. 28C Side view of the handle end cap.

FIG. 29 Cover slip ring housing.

FIG. 29A Cross-section of the cover slip ring housing.

FIG. 29B Side view of the cover slip ring housing.

FIG. 29C Side view of the cover slip ring housing.

FIG. 30A Front elevation view of the gas cap clip.

FIG. 30B Edge view of the gas cap clip.

FIG. 36 Expanded elevational view of connection of strain gage contacts to contact rings.

FIG. 37 Plan view of contact brushes mounted on contact carrier.

FIG. 38 Elevational segment view of contact carrier.

FIG. 39 Wire connection layout of gas cap monitor.

FIG. 40 Plan view of contact carrier and brushes and a contact ring.

FIG. 41 Enlarged elevational view of contact carrier in relation to contact rings.

FIG. 42 Comprising of FIGS. 42A and 42B is a view of the wire grommet.

FIG. 42A Edge view of the wire grommet.

FIG. 42B Plan view of the wire grommet.

FIG. 43 Elevational view of gas cap.

FIG. 44 Elevational view of section A—A of gas cap FIG. 43.

FIG. 45 Magnified elevational view of meshing of flex tongue point and ridge cogs at base of handle.

FIG. 46 Assembled apparatus for monitoring motor vehicle fuel tank gas cap, in relation to fuel gas cap on filler pipe of vehicle fuel tank.

FIG. 47 Assembled apparatus for monitoring motor vehicle fuel tank cap, in contact with the fuel tank cap held in the torsion plate of the assembled apparatus.

LEGEND DESCRIPTIONS

Figure 7:
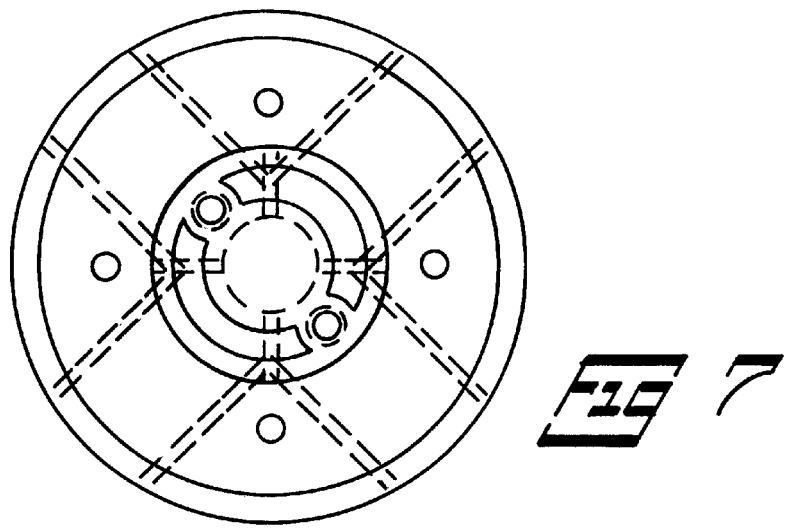
FIG. 7 Plan view of top of torsion plate.
Figure 6:
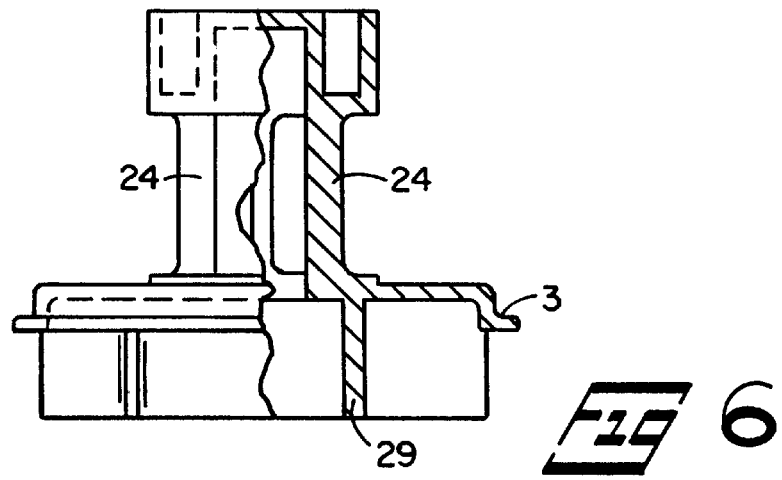
FIG. 6 Side view of torsion plate.

| LEGEND # | DESCRIPTION | FIGURES |
|---|---|---|
| 1 | Monitor box - Microprocessor or computer | 1, 34, 46 |
| 2 | Filler blocks | 4. |
| 3 | Torsion plate | 1, 2, 5, 6, 7, 36 |
| 4 | Torsion plate cover | 1, 8, 9A, B, C. 46 |
| 5 | Grommet for wires from torsion plate | 1, 42. |
| 6, 6', 6", 6''' | Contact ring spacers. | 1, 10, 36 |
| 7, 7', 7", 7''' | Contact rings.(Brass silver plated) | 1, 11, 36 |
| 8 | Top contact ring spacer. | 1, 12. 36 |
| 9 | Lower seal | 1, 13, |
| 10 | Slip ring housing | 1, 8, 14, 15, 16, 17. 29, 46 |
| 11 | Upper seal | 1, 18 |
| 12 | Contact wire carrier to monitor. | 1, 8, 19, 20, 21, 22, 23, 46 |
| 13 | Contact terminal | 21, 22, 24, 38, 40, 41. |
| 14 | Cross bar of handle | 1, 8, 26A, B, 27B, 46 |
| 15 | Handle | 1, 8, 26, 27. |
| 16 | Handle end caps | 28. |
| 17 | Slip ring cover housing. | 25A, B, C, D, 25, 29A, B, C. |
| 18 | Flex tongue point | 25A, 25B, 45. |
| 19 | Gas cap clip | 2, 30, 32. |
| 20 | Contactor brushes | 23, 37, 40. |
| 21 | Fuel cap top. | 3, 43, 44, 46. |
| 22 | Fuel cap ball. | 3, 31, 32, 46 |
| 23 | Assembly screws | 1, 25C. |
| 24 | Torsion plate shaft pillars | 1, 6, 33, 35, 36. |
| 25 | Torsion plate shaft crown | 1, 6, 33, 36. |
| 26 | Monitor computer alarm | 1, 34, 39, 46 |
| 27 | Electric power supply to system | 1, 34, 39. |
| 28 | Threaded openings in torsion plate crown for screws 23 | 1, 6, |
| 29 | Channel walls in torsion plate. | 5. |
| 30 | Channels in torsion plate | 5 |
| 31 | Flex tongue | 25A 25B |
| 32 | Ridge cogs in base of handle; (one ridge cog of a plurality) | 27, 27B, 45. |
| 33 | Base of handle | 1, 26A, B, 27A, 27C, 46 |
| 34 | Bundle of wires from strain gages of wheatstone bridge to contact rings | 36 |
| 35 | Tension strain gages 35T1; 35T2; 35T3; 35T4. | 33, 34, 35 |
| 35' | Compression Strain gages 35'C1; 35'C2; 35'C3; 35'C4 | 33, 34, 35 |
| 36 | Contactor arms. | 23, 37, 40 |
| 37 | Assembled gas cap monitor apparatus | 8, 46 |
| 38 | Vehicle fuel tank filler pipe | 31, 32, 46 |
| 39 | Ridge of gas fuel cap. | 3, 43, 44, 46 |
| 40 | Fuel tank cap | 43, 44 |
| 41 | Notches on inside diameter of contact electrically insulating spacers | 10 |
| 42 | Shoulder of shaft of slip ring cover housing | 1, 25 |
| 43 | Shaft of slip cover ring housing | 1, 25 |

-continued

LEGEND DESCRIPTIONS

| LEGEND # | DESCRIPTION | FIGURES |
|---|---|---|
| 44 | Through holes for screw threads only of screws 23 to torsion plate crown threads | 1, 25C |
| 45 | Through holes in torsion plate cover for screws 23. | 9A, 9B, 9C |
| 46 | Spaces between channels of torsion plate. | 5 |
| 47 | Flex snap arms of gas cap clip. | 3, 30, 32 |
| 48 | Assembly of components of Fig. 1 | 8, 46, 47 |
| 49 | Contact ring inside diameter strain gauge connector | 11A, 11B |
| 50 | Hub shaft of torsion plate cover | 1, 9B, 9C |
| 51 | D.C. electric supply. | 34 |
| 52 | Splines on hub shaft of torsion plate cover | 9C |
| C1, C2, C3, C3 | Compression strain gages. | 33, 34, 35 |
| T1, T2, T3, T4 | Tension strain gages. | 33, 34, 35 |

Bundle of wires to convey electrical/resistance charges, identified by color code:

R—Red

G—Green.

W—White.

B—Blue

These wires extend from strain gages on torsion plate pillars to contact rings to contact brushes to wires to monitor box to micro computer to signal audible or visual, or other response.

DETAILED DESCRIPTION OF INVENTION

Figure 5:
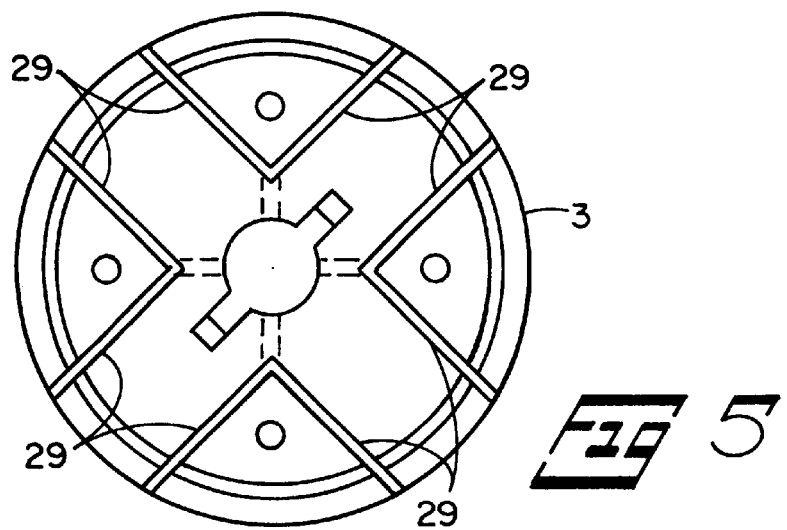
FIG. 5 Bottom plan view of torsion plate bell section.
Figure 14:
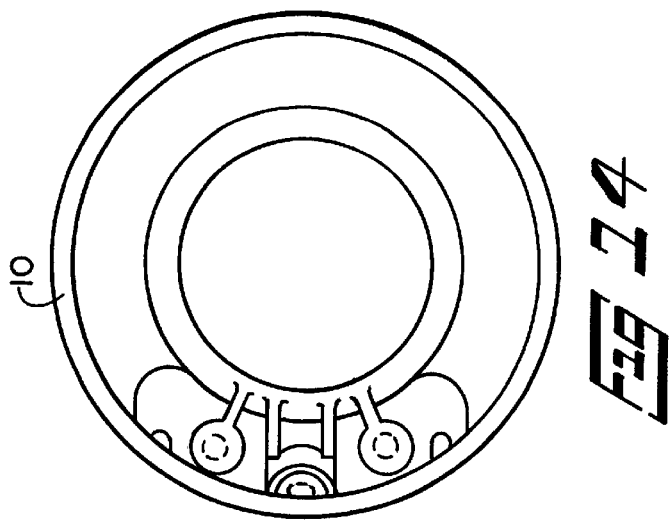
FIG. 14 Slip ring housing bottom plan view.
Figure 15:
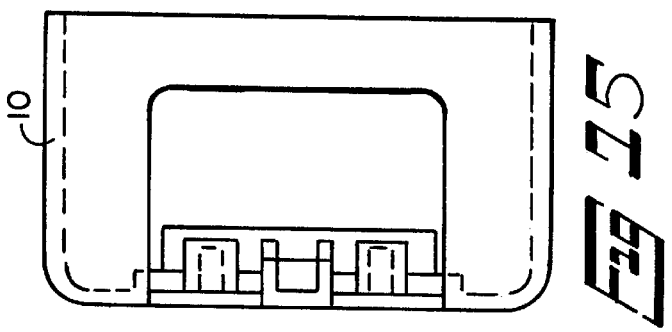
FIG. 15 Slip ring housing, edge view.
Figure 17:
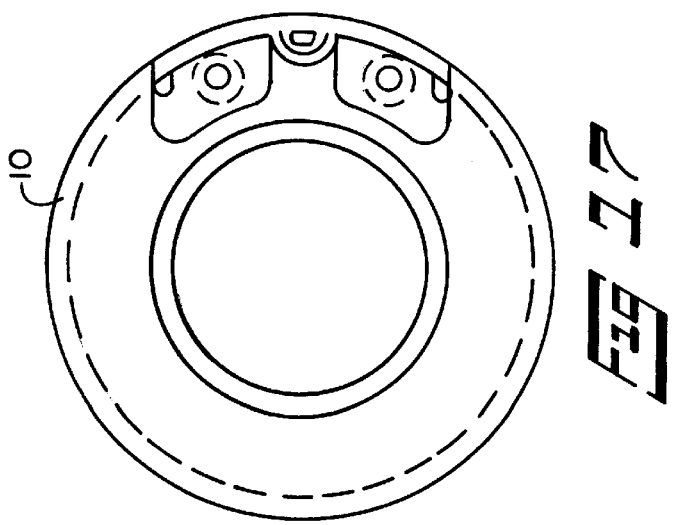
FIG. 17 Slip ring housing top plan view.
Figure 16:
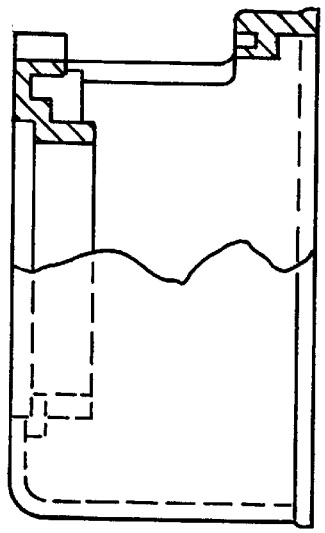
FIG. 16 Slip ring housing elevational view.

The apparatus of vehicle fuel gas cap monitor and method of monitoring the vehicle fuel tank cap or "fuel/gas cap" is described as assembled gas cap monitor as shown in FIG. 8, and the component parts are as shown in FIG. 1, and this apparatus is usable by hand, by placing over the vehicle gas or fuel cap as shown in FIG. 46, then rotating or turning the handle counter clock wise to remove the gas cap 40 from the filler pipe 38 of the vehicle. The gas cap monitor apparatus includes a torsion plate 3 (FIGS. 2, 5, 6, 7) and in the bottom of the torsion plate 3, there are channel walls 29 (FIG. 5), and these channel walls 29, providing channels 30 (FIG. 5) in the bottom of the torsion plate 3. These channels 30 are of sufficient width to straddle gas cap ridge 39 (FIGS. 43, 44, 46) on placing the assembled fuel/gas cap monitor apparatus 37 (FIG. 46) over the fuel/gas cap top 21 (FIGS. 43, 44, 46) on the fuel tank filler pipe 38. Mounted over the torsion plate 3, is a torsion plate cover 4 (FIGS. 1, 8, 9A, 9B, 9C, and 46) and there are holes 45 as shown in FIG. 9C to allow the screws 23 to extend through and into threaded holes 28 in the crown 25 of the torsion plate shaft. Pillars 24, 24', 24"24''' (FIGS. 1, 6, 33, 35, 36) are attached to the torsion plate shaft crown 25, (FIGS. 1, 6, 33, 36) and there is mounted on each torsion plate shaft pillar 24, one compression strain gage 35 C1, mounted on torsion plate pillar 24, 35 C2 mounted on torsion plate pillar 24', 35 C3 mounted on torsion plate pillar 24" and 35 C4 mounted on torsion plate pillar 24''' and on each torsion shaft pillar 24 on the side opposite each compression strain gage there is mounted a strain gage indicating tension T1, T2, T3, T4, (FIGS. 33, 35, 36).

Figure 35:
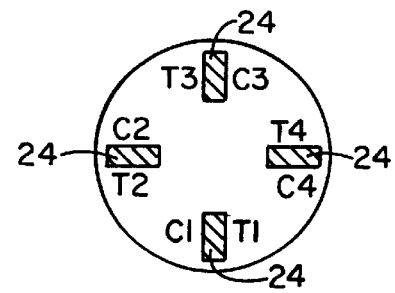
FIG. 35 Plan view B—B of torsion plate pillars showing strain gage contacts of wheatstone bridge.

Mounted on torsion plate pillar 24 tension strain gage 35T1, 35T2 mounted on pillar 24', 35T3 mounted on pillar 24" and 35T4 mounted on pillar 24''', (FIGS. 33, 35) The above mentioned pillars have a typical cross section dimension of for example, of about 0.055"×0.200" with the 0.200" dimension extending outward on a radius line, as shown in FIG. 35, and the strain gages C1–C4 and Tension gages T1–T4 are mounted on the sides of the long dimension in the direction of the radius line. In all of the above and following discussion, the word pertaining to "wire" or "wires" is meant to be for conductors of electrical signal.

Figure 34:
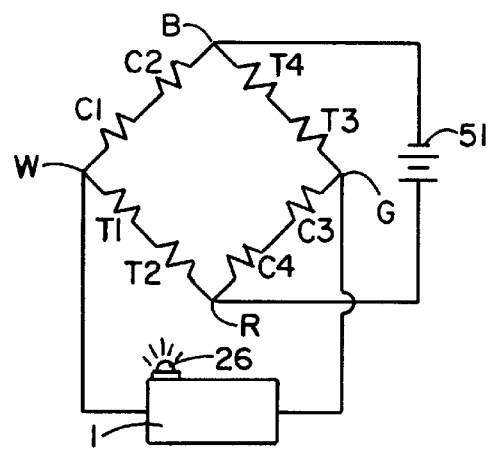
FIG. 34 Wheatstone bridge circuit layout.
Figure 33:
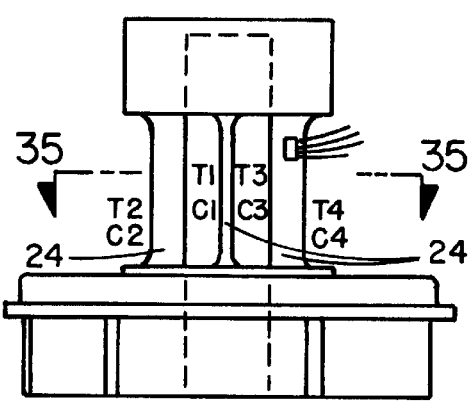
FIG. 33 Elevational view of torsion plate.

Referring now to FIGS. 33, 34, and 35, wires are attached to the strain gage circuit, which wires are coded R—red, B—blue, G—green, and W—white as shown in FIG. 34, and these coded wires extend upward to contact rings 7, 7', 7" and 7'" (see FIGS. 1, 9B, 11) and the wires are connected to the contact rings as follows, 7R, 7'B, 7"G, 7'"W. The contact rings 7–7'" are insulated electrically each from the other by means of contact ring spacers 6, 6', 6", 6'" FIGS. 1, 10), and a top contact ring spacer 8 (FIG. 12) and a lower contact ring spacer 6'", (FIGS. 1, 10) The above noted contact rings 7–7'" and contact ring spacers 6, 6', 6", 6'" are stacked on the shaft of the torsion plate cover 4 as shown in FIGS. 1, & 10 Contact ring spacers 6, 6', 6", 6'", as shown in FIG. 10, notches 41, on the inside diameter of each, and are of electric insulative material, such as nylon. Mounted over the top contact ring spacer 8 is a lower seal 9,(FIGS. 1, 13) and serves to seal the bottom rim of slip ring housing 10 (FIGS. 1, 8, 14, 15, 16, 17, 46) onto the shoulder of torsion plate cover 4 (FIG. 1), thus covering the assembled contact rings connected to the wires as noted above. There is an upper seal 11 (FIGS. 1, 18) mounted on the top of slip ring housing 10 to fit between the slip ring housing 10 and the shoulder 42 of slip ring cover housing 17 (FIGS. 1, 25A, B, C, D, 25, 29A, B, C.). The shaft 43 of slip ring cover housing 17, is fitted into the top of slip ring cover 10, and holes are provided for insertion of screws 23 (FIGS. 1, 25B, C, D) which screws will on assembly extend to threaded openings 45 in crown 25 of torsion plate 3. The top opening of slip ring cover housing 17 (FIG. 25A 25C, 25B and 45) comprises flex tongues 31 and flex tongue points 18 having the shape of an equilateral or isosceles triangle, on the flex tongues 31, and the tongues 31 concentric to the outer edge of the top opening of the slip ring cover housing. (see FIGS. 25A & 45.

The bundle 34 of the four wires from strain gages of wheatstone bridge circuit as shown in FIGS. 1, 36, extend from the strain gages C1, C2, C3, C4 and T1, T2, T3, T4 mounted on torsion plate shaft pillars 24, 24', 24" and 24'" through a grommet 5 (FIG. 1, 42) in the torsion plate cover 4 and attached to electrically conductive contact rings 7, 7', 7", 7'", preferably of silver plated brass.

The electric charge conveyed to the collector rings 7–7'" by the wires R, G, W, and B bled off by 12 contact wire carrier to monitor, by means of contactor brushes 20,(FIG. 23) two of which are mounted on contactor arms 36 (FIGS. 36, 37, 38, 40, 41) and the contactor arms 36 are attached to a contact terminal 13. There is a separate set of contactor brushes 20, contactor arms 36, and contact terminal 13, as described above for each of collector ring 7,7',7",7'", thus there are four contact terminals 13 (FIG. 24) of either brass or copper, and silver plated mounted on contact wire carrier 12 to monitor 1 and this contact wire carrier 12 to monitor 1 is mounted within the slip ring housing 10 and wires extend from the contact wire carrier 12 to a monitor box 1 (FIGS. 1, 34, 36, 19, 20, 21, 22)

Referring now to the handle 15, of this gas cap monitor apparatus (FIGS. 26A, 26B, 27, 27A, and 27B) the base of the handle 33 is to fit by a snap fit over the top of slip ring cover housing 17 and inside of the base 33 of the handle are ridge cogs 32 in base of the handle, and these ridge cogs 32 extend out on radius lines and further the ridge cogs 32 are in the shape of an equilateral or isosceles triangle in cross section elevation (FIGS. 27b, & 45) such that the side of ridge cog 32 meets the section of flex tongue point 18 which tongue point is in the shape of an equilateral or isosceles triangle to allow rotation in either clockwise direction. (see FIG. 45) Cross bar 14, of the handle (FIGS. 26A, 26B & 27 & 27A) is to provide turning leverage of the assembled gas cap monitor 37.

In order to prevent bypassing the use of the monitor filler blocks 2 (FIG. 4) can be mounted in spaces 46 in torsion plate 3, which spaces 46 adjoin the channel walls 29 of the torsion plate 3.

Handle end caps 16 (FIG. 28) molded of rubber material, may be mounted over cross bar 14 of the handle of the monitor assembly 37 for ease of handling.

Figure 31:
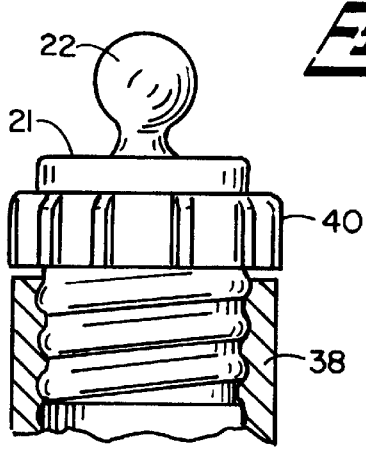
FIG. 31 Gas cap cover ball.
Figure 32:
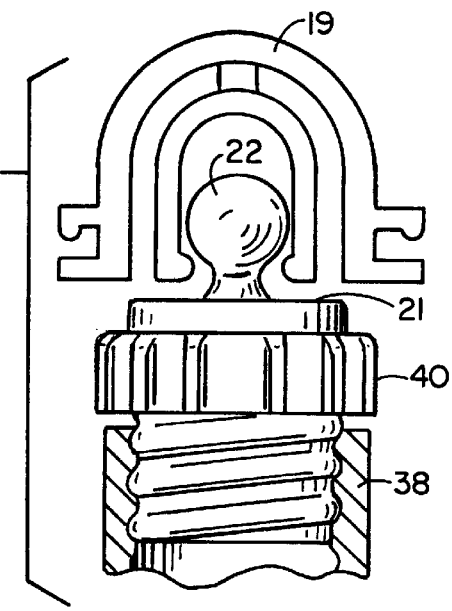
FIG. 32 Enlarged elevational view of gas cap held in gas cap clip.

Reference is now made to the fuel/gas cap of this invention, which is part of the apparatus and method for monitoring the fuel/gas cap to insure adequate tightening of the cap on vehicle refueling. The fuel/gas tank cap 40 (FIGS. 31, 43, 44) has a ridge 39, on the top surface of the cap and mounted on top of this ridge is a fuel/gas cap ball 22, and on placing the monitor assembly 37 over the gas cap 40 having the ridge 39 and ball 22,(see FIG. 46) the gas cap ball 22, fits into the gas cap clip 19 and arms 47 of the gas cap clip 19 snap around the ball 22, (see FIGS. 30, 32) and the gas cap ridge 39 fits into the channels 30 in torsion plate 3, and the monitor assembly 37 turned counter-clockwise to remove the gas cap 40 and the gas cap is held in the monitor assembly by means of the gas cap clip 19, while refueling, then after refueling the gas cap 40 held in the monitor assembly is placed on the fuel tank filler pipe 38 (FIG. 46) and the assembly is turned, rotated or revolved, by hand to adequately secure the fuel cap 40 onto the fuel tank filler pipe 38.

This apparatus for monitoring motor vehicle fuel tank caps 40 for proper mounting on fuel filler pipe 38, includes a monitor assembly 48 and strain gauges 35, 35' mounted on torsion plate shaft pillars 24 of the torsion plate 3 in the monitor assembly 48, and monitor computer 1 and alarm 26 responsive to output signals from the strain gauges 35, 35' for generating a signal to the monitor computer alarm 26.

The monitor computer alarm 26, is shown in FIGS. 1, 34, 39, and 46 as attached to the monitor box 1, however the alarm 26 may be mounted away from the monitor box 1, tethered and connected thereto by conductive wires as needed.

The electric power supply to the system 27, may be a plug-in, to the electric supply, and a rectifier for D.C. current to the strain gauges or by a battery electric D.C. supply.

In this invention disclosure the term "gas cap" or "fuel/gas cap" have the same meaning as "motor vehicle fuel tank cap", and are used interchangeably.

Contact rings 7, 7', 7", and 7'" each have on the inside diameter a strain gauge wire mount 49, for connection of wires from the strain gauges.

Contact ring spacers 6, 6', 6", and 6'" each have notches 41 described as inside diameter notches, and these contact ring spacers 6, 6', 6", and 6'" fit over the hub shaft 50 of torsion plate cover 4, and the notches 41 fir over splines on the hub shaft 50, and the spacers are of electrical insulative plastic material, such as nylon and similar material.

The mechanics of using the vehicle fuel tank cap apparatus of this invention is best described as a tool handled by the person filling a vehicle fuel tank, by grasping the handle 15 of the apparatus and placing over the fuel cap 40 (se FIG. 47) and rotating the apparatus counter clockwise and lifting the fuel cap 40 out of the fill pipe and the cap 40 is held in the apparatus. After refueling, the apparatus holding the fuel cap 40 is placed over the filler pipe 38 and rotated clockwise to tighten the fuel cap 40 as will be indicated by the monitor 1 and alarm 26 and electric power supply 27 tethered to the apparatus, and then removing the apparatus from the filler pipe and fuel cap. The alarm is to indicate inadequate tightening of the fuel cap 40, on the filler pipe 38.

Having described my invention I claim:

1. Apparatus for monitoring motor vehicle fuel tank caps comprising;
   a a torsion plate and channel walls in said torsion plate;
   b said channel walls providing channels in said torsion plate;
   c a torsion plate cover extending over said torsion plate;
   d a shaft of said torsion plate comprising torsion plate shaft pillars, and said pillars connected to a crown on shaft of said torsion plate;
   e a strain gauge mounted on each of said torsion plate shaft pillars;
   f said strain gauges comprising a wheatstone bridge circuit, with wires extending from said strain gauges to contact rings mounted inside of said torsion plate cover;
   g one wire of said wires from each said strain gauge connected to a separate one of said contact rings;
   h said contact rings are insulated each from the other by means of insulating ring spacers;
   i said electric wires from said strain gauges attached to said contact rings and;
   j contactor brushes for each said contact ring in contact with its respective said contact ring and said contactor brushes mounted on contactor arms;
   k each said contact ring having its own set of a pair of said contact brushes mounted on said contactor arms and;
   l a separate wire connected to each said contactor arm pair and said wire from each said contactor arm pair extending to a monitor computer alarm box, wherein response is made to a pre-set limit of electrical response as relayed by said strain gauges in response to torque developed on rotating said handle of said fuel tank cap torque monitoring apparatus on rotating said fuel tank cap on said filler pipe of said fuel tank.

2. Apparatus for monitoring motor vehicle fuel tank caps of claim 1 further comprising:
   a monitor assembly and strain gauges mounted in said monitor assembly;
   monitor computer alarm means responsive to output signals from said strain gauges for generating a signal to said monitor computer alarm.

3. Apparatus for monitoring motor vehicle fuel tank caps of claim 2, further comprising:
   said strain gauges mounted on torsion plate shaft pillars of said torsion plate.

4. Method for monitoring motor vehicle fuel tank caps mounted on filler pipe comprising:
   a a torsion plate and channel walls in said torsion plate;
   b said channel walls providing channels in said torsion plate;
   c a torsion plate cover extending over said torsion plate;
   d a shaft of said torsion plate comprising torsion plate shaft pillars, and said pillars connected to a crown on shaft of said torsion plate;
   e a strain gauge mounted on each of said torsion plate shaft pillars;
   f said strain gauges comprising a wheatstone bridge circuit, with wires extending from said strain gauges to contact rings mounted inside of said torsion plate cover;
   g one wire of said wires from each said strain gauge connected to a separate one of said contact rings;
   h said contact rings are insulated each from the other by means of insulating ring spacers;
   i said electric wires from said strain gauges attached to said contact rings;
   j contactor brushes for each said contact ring in contact with its respective said contact ring arms;
   k each said contact ring having its own set of a pair of said contact brushes mounted on said contactor arms and;
   l a separate wire connected to each said contactor arm pair and said wire from each said contactor arm pair extending to a monitor computer alarm box wherein response is made to a pre-set limit of electrical response as relayed by said strain gauges in response to torque developed by the step of rotating clockwise said handle of said fuel tank cap torque monitoring apparatus on tightening said vehicle fuel tank cap on said filler pipe of said fuel tank.

* * * * *

UNITED STATES PATENT AND TRADEMARK OFFICE
CERTIFICATE OF CORRECTION

PATENT NO. : 6,285,934 B1
DATED : September 4, 2001
INVENTOR(S) : Richard J. Shaw It is certified that error appears in the above-identified patent and that said Letters Patent is hereby corrected as shown below:

<u>Drawings,</u>
Sheet 12 of 14, consisting of Figs. 36-39, should be replaced with the corrected drawing sheet as shown on the attached page.

Signed and Sealed this

Thirteenth Day of August, 2002

*Attest:*

*Attesting Officer*

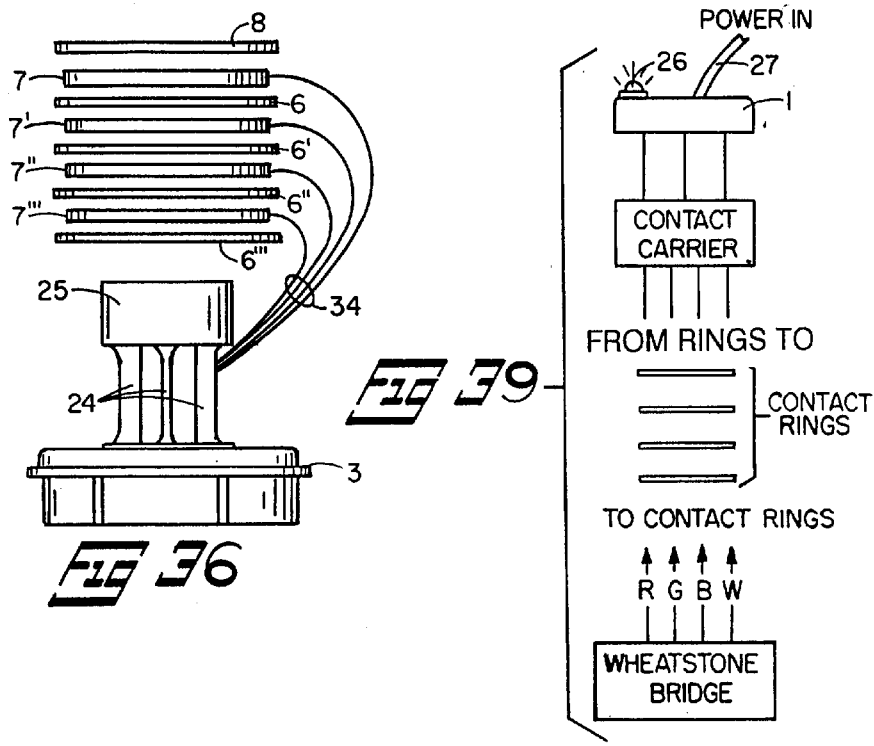
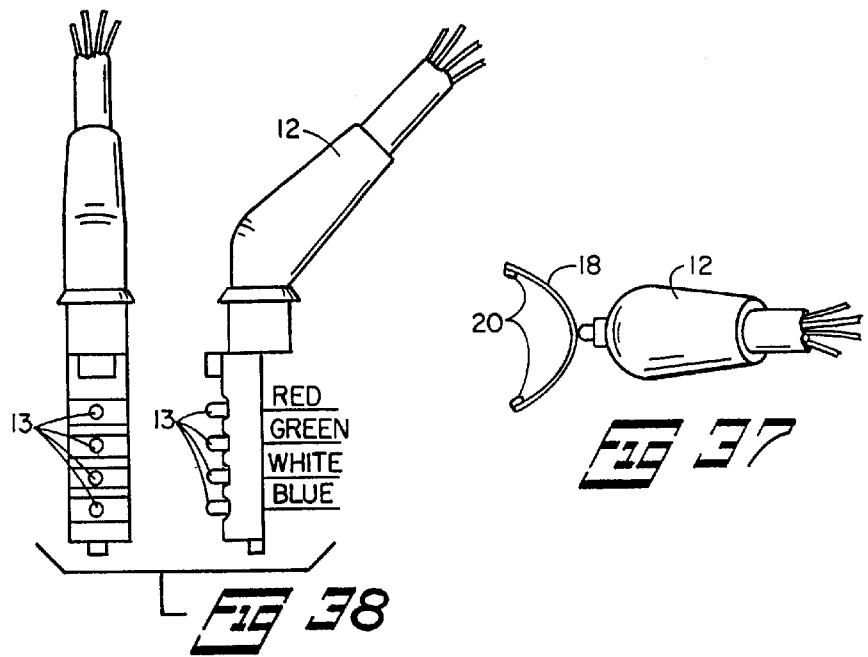

JAMES E. ROGAN
*Director of the United States Patent and Trademark Office*